March 18, 1952  B. STORSAND  2,589,453
ELECTRIC VEHICLE RUNNING BETWEEN TWO CHARGING
STATIONS WITHOUT A CONTACT-LINE
Filed July 28, 1945  3 Sheets-Sheet 1

Inventor
Bjarne Storsand
By Singer, Ehlert, Stern & Carlberg
Attorneys

March 18, 1952      B. STORSAND      2,589,453
ELECTRIC VEHICLE RUNNING BETWEEN TWO CHARGING
STATIONS WITHOUT A CONTACT-LINE
Filed July 28, 1945      3 Sheets-Sheet 2
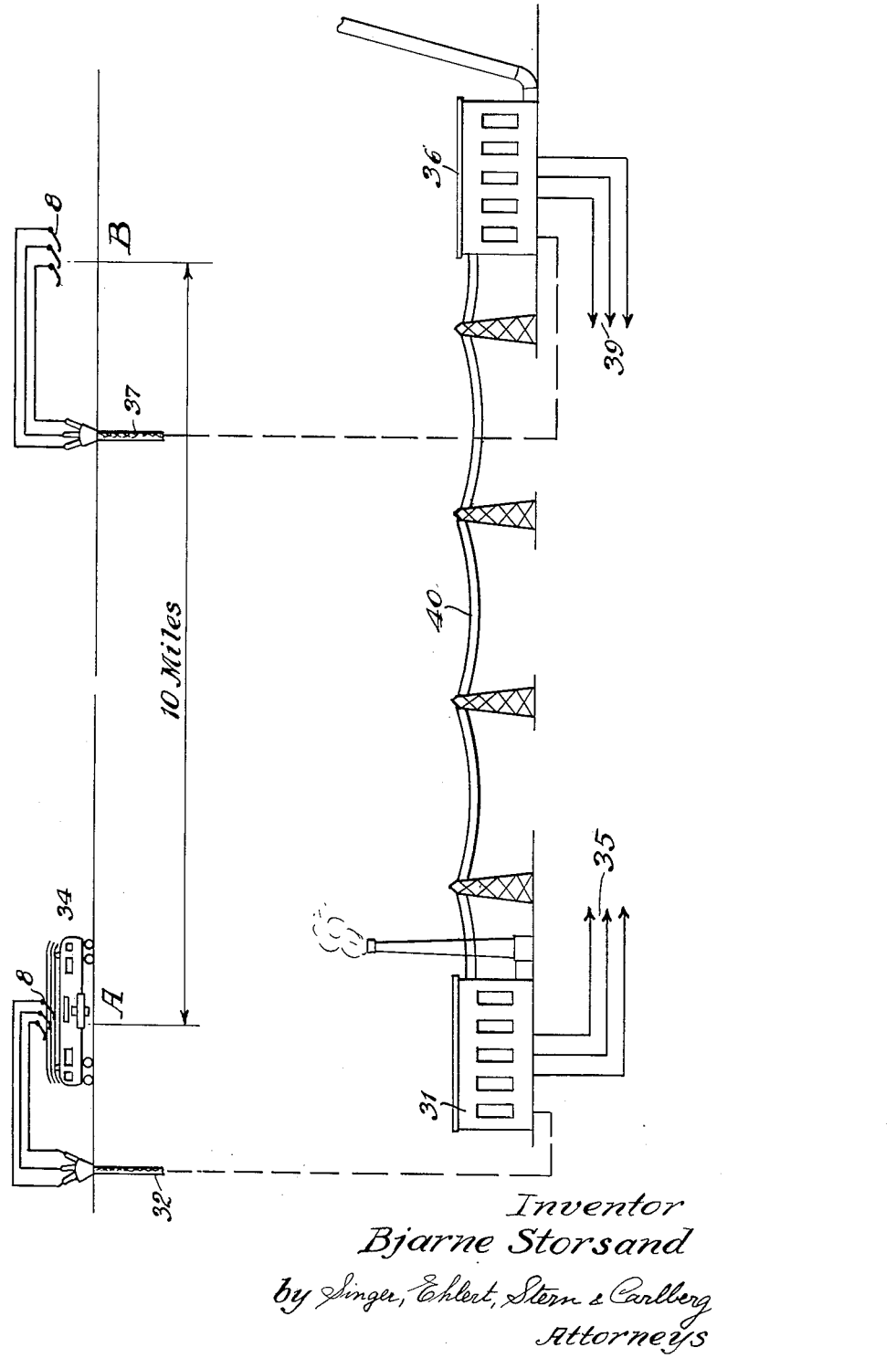
Inventor
Bjarne Storsand
by Singer, Ehlert, Stern & Carlberg
Attorneys

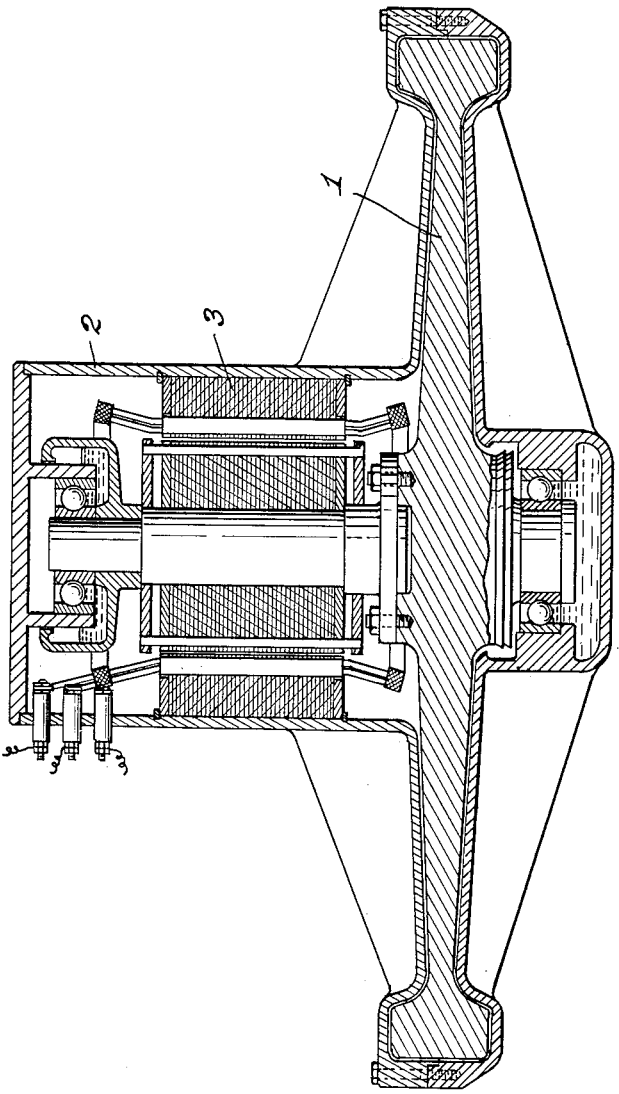

Patented Mar. 18, 1952

2,589,453

UNITED STATES PATENT OFFICE 2,589,453

ELECTRIC VEHICLE RUNNING BETWEEN TWO CHARGING STATIONS WITHOUT A CONTACT-LINE

Bjarne Storsand, Zurich, Switzerland, assignor to Maschinenfabrik Oerlikon, Zurich-Oerlikon, Switzerland, a Swiss firm Application July 28, 1945, Serial No. 607,529
In Switzerland June 17, 1944

Section 1, Public Law 690, August 8, 1946
Patent expires June 17, 1964

1 Claim. (Cl. 104—148)

The present invention relates to a new and improved electric vehicle, adapted to pick up and store electrical energy at certain charging stations and to complete the run between the said charging stations by means of the stored energy.

The disadvantages of the normal electro-chemical accumulators regarding their short durability, high weight, low efficiency, high maintenance costs and long charging time, are so important that they could only be considered economical for some few cases of electric traction, such as low powered delivery vans, small shunting locomotives etc.

Practically all heavier electric traction systems such as have to be used for tram cars, trolleybus service, and main line railway have to make use of single or double poled contact line for the delivery of energy to the driving vehicle.

In cases, where contact lines cannot be installed as for instance in propelling ferryboats and ships the electric propulsion could not practically be made use of.

In many cases, as for instance in narrow streets the provision of one or two double poled contact lines for trolleybus service has to be regarded as a serious disadvantage.

The main object of the invention consists in the provision of means in which all these disadvantages are suppressed.

I attain the said object by the use of an electrically driven fly-wheel, which is brought to the necessary speed during a charging period and which fly-wheel stores sufficient energy to provide for the driving of said vehicle between two consecutive charging stations.

The mechanical energy stored in the fly-wheel is transformed into electrical energy and this is transmitted to the driving motors of the vehicle, the electric motor used for starting up the fly-wheel being used as an electric generator.

This driving system can be employed for all sorts of vehicles, which at regular intervals can pick up the necessary energy at charging stations. Provided an effective fly-wheel having a mass of about 10% of the total vehicle weight, and making use of high tensile strength steel for the wheel, sufficient energy can be stored to move an electric rail-car for a distance of about 12–18 miles without recharging. The charging of the fly-wheel can be completed in 1–2 minutes.

An electric bus, or an electric driven ferry boat, under the same weight conditions may be driven 3–6 miles without recharging. To obtain this result a number of important constructional features are to be considered.

Firstly, the maximum circumferential speed of the fly-wheel, in order to store the necessary energy, should exceed 150 meters per second. Circumferential speeds varying from 150–300 meters per second are to be recommended for normal use.

To permit such high speeds without enormous energy losses due to air friction, it is necessary to let the fly wheel run in a closed container, filled with a light gas such as hydrogen or helium, preferably at a reduced pressure or in vacuum. A mixture of helium and hydrogen permits the use of pressures between 10% and 90% of the atmospheric pressure without risks of deflagration in case of air entering the container. The use of pure hydrogen should be restricted to pressures of above 90% and under 10% of the atmospheric pressure to ensure safety against explosions.

Using for instance 10% hydrogen filling in combination with effective ball bearings for the shaft of the fly-wheel the latter will run for more than 12 hours reducing its speed from full speed to half speed. To avoid the use of rotating sealing glands or of stuffing boxes for the shaft of the motor the latter may be located in a housing, forming part of the fly wheel container, thus only the electric connections are to be led into the housing by normal vacuum tight seals, such as used in mercury rectifier practice.

To avoid dangerous gyroscopic effects in curves on the vehicle and on starting the passage of a step gradient of a hill, the fly wheel has to be mounted with a vertical axis and has to be provided with damped shock absorbing suspension means permitting a certain relative movement of the fly wheel assembly with reference to the vehicle.

The fly wheel will effect a stabilizing influence on the vehicle.

If two co-axial fly wheels are used, rotating in opposite direction, the gyroscopic effects will be eliminated, said means also permitting the use of horizontal shafts for the fly wheel.

It is further of advantage to use a system of electric motors for driving the fly wheel which can be switched on to the normal three phase A. C. net without needing an intermediate converter. A motor without collector brushes and sliprings, such as an A. C. three phase induction motor with squirrel cage armature preferably provided for pole changing from 2–4 poles running as an asynchronous generator with capacity excitation during the discharge, is the most suitable motor. The excitation of the generator is provided by switching on and off parts of the condenser battery.

The traction motors are multi speed A. C. induction slipring motors, preferably for 2–3 synchronous speeds.

In combination with the pole changing of the generator 4–6 synchronous speeds sufficient for economical speed regulation during the discharge are obtained. During the braking of the vehicle, energy recuperation is practicable.

Variable speed A. C. collector motors may also be used as traction motors.

In combination with D. C. traction also a normal D. C. machine can be used, but in this case special constructional precautions as to brush adjustment, elimination of carbon dust etc. are necessary.

The use of mercury arc converters for charging and decharging the fly wheel set can in certain cases be of advantage.

My invention resides further in the new and novel construction, combinations and relations of the various parts hereinafter more fully described and disclosed in the drawings accompanying this specification.

In the drawing:

Fig. 2 illustrates a traction line system employing the vehicle of the present invention, and Fig. 3 is a sectional view of a modified energy storing device of the vehicle.

Figure 1:
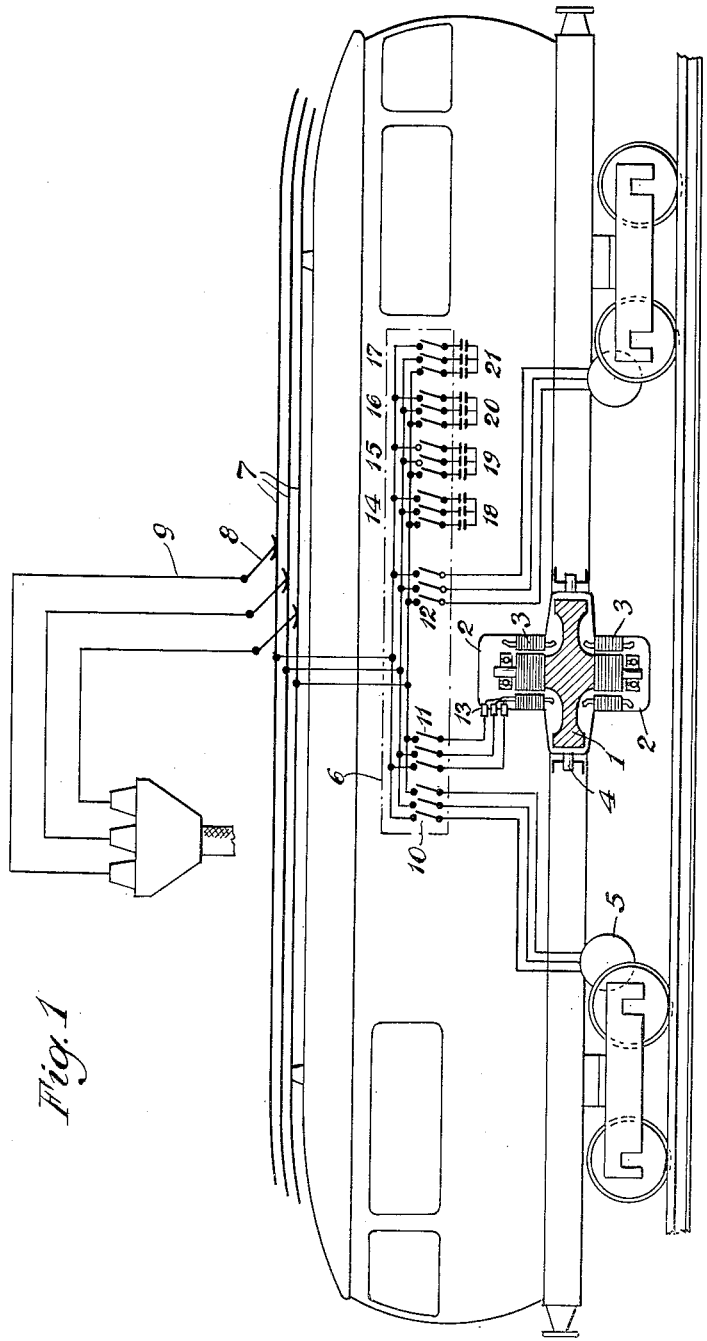
Fig. 1 is a side view showing a railway car in a diagrammatical manner, parts being shown in section.

In Figs. 1 and 3 1 denotes a fly wheel, 2 a casing, 3 two driving motors, arranged on each side of the fly wheel, 4 a suspension device for the fly wheel set, 5 a traction motor, 6 a control device, 7 a contact device permitting energy supply at the halting stations of the car. The control device 6 consists of the switches 10, 11 and 12 and additional control switches 14, 15, 16 and 17 for controlling the exciting condensers 18, 19, 20 and 21, respectively. These switches are provided to be manipulated by the operator of the vehicle as follows: At the charging station switch 11 is closed and all the other switches are opened so that the driving motors 3 (Fig. 1) are energized and impart the necessary speed to the flywheel 1 to store energy in the latter, at least until the vehicle arrives at the next charging station. When the necessary amount of energy has been stored into the flywheel 1, the motors 3 may operate as a generator and this is done by closing the switches 10 and 12 and opening the switch 11. The switches 14, 15, 16 and 17 may also be closed to excite the traction motors 5 in the desired manner so that the vehicle may now travel to the next charging station. The switches 14, 15, 16 and 17 may be selectively closed or opened to control the excitation of the traction motors which is operated from the electric current produced in the windings of the motors 3 which act as generating windings as long as the flywheel 1 rotates with the required speed.

Fig. 2 illustrates a traction line provided at A and B with charging points, which, for instance, are arranged ten miles apart from each other. 31 illustrates the current generating plant for distributing electric current in the territory around A and 32 illustrates the supply line to A. At 8 are illustrated three contact members for the three phases. 34 illustrates the vehicle of the present invention provided with the flywheel generating plant. 35 illustrates the transmission lines which supply the conventional distributing systems. At B is illustrated another supply point which, for instance, may receive its electric current from the generating plant 36 which as shown may consist of a hydroelectric generating plant. This last named plant supplies the point 8 with electric current by means of the cable 37. At the point B are again shown the contact members adapted to be electrically connected with the vehicle and at 39 are the distributing lines of the hydroelectric plant 36. Both generating plants 31 and 36 may be interconnected with each other by the transmission line 40.

For starting the vehicle energy can also be drawn directly from the network, thus reducing the energy needed from the fly wheel set.

If combined with an aërial trolleyline for a certain distance energy charging is also possible without stopping the vehicle.

For passing step gradients an additional energy supply to the vehicle by means of a contact line can be considered.

It is important to note that the three phase A. C. fly wheel motor, once it has attained its speed, can be charged with single phase current, and at the same time it also will work as a single phase, three phase converter, permitting the vehicle to run on a single phase contact line, feeding the traction motors with three phase current.

If a maximum speed has to be attained, higher than the normal synchronous speed of a 2 poled motor at network frequence, a frequency changer set can be provided. If a twin A. C. motor for instance with 4 and 6 poles is used for the traction motor this can also be used as a frequency changer producing a frequency 66% and 150% of the network frequency. Some safety devices should be provided for permitting the rapid braking of the fly wheel in case of defects in the operation of the device, moreover means for avoiding the blocking of the bearings.

The emergency braking of the fly wheels can be effected by permitting air or a fluid, such as water or oil to enter the container. Also electrical braking of the motor can be considered by exciting the stator of the A. C. motor with D. C.

The bearings of the fly wheel shaft have to be safe against possible defects and especially against blockage. Auxiliary bearings may be provided to serve the purpose that only come into action when the main bearing shows a defect, thus permitting an escapement of the energy stored in the fly wheel mass.

If, for instance, the ring of the roller bearing in the case is fitted in an axially rotating box, with the gliding surface lubricated, then, when the main bearing is blocked, the box will rotate and thus allows the fly wheel to run on.

This rotating box is being braked by suitable means so that it only rotates when the torque reaches a pre-determined low limit. Furthermore, when the safety box rotates, oil can be let into the container thus rapidly braking the fly wheel and simultaneously lubricating the bearings of the safety box.

Fig. 3 shows in section a further embodiment of my invention. In Fig. 3, the flywheel 1 is provided with a roller bearing. Any anti-friction bearing might be used. 12 denotes the main bearing, 13 the safety box with gliding surfaces, 14, 15 the surfaces of the emergency bearings of self-lubricating material.

Furthermore, an emergency-bearing could be employed which has both axial as well as radial play on the bearing surfaces and so chosen that its surfaces only come into action when the main bearing has become worn out.

The emergency bearings can also be designed as roller bearings. The surfaces of the emergency bearings can be made of a self-lubricating material (such as a porous metal the interstices being filled with oil).

What I wish to secure by United States Letters Patent is:

In an electrically driven vehicle having at least one traction wheel motor for propelling the vehicle, a closed casing filled with a gaseous medium having a pressure below the atmospheric pressure, an electrodynamic machine having an armature shaft and a flywheel connected to the shaft, thereby forming an electro-mechanical unit mounted in said closed casing, means adapted to supply said electrodynamic machine with electric current by stationary sources of electric current at the stopping points of the vehicle to operate said electrodynamic machine as a motor to drive said flywheel and store energy therein, said flywheel being adapted to operate said electrodynamic machine as a generator during the travelling movement of the vehicle to supply electric current to said traction wheel motor, said electrodynamic machine consisting of a three-phase squirrel cage machine without sliprings and without commutator and when operated as a generator being provided with capacitative field excitation.

BJARNE STORSAND.

REFERENCES CITED

The following references are of record in the file of this patent:

UNITED STATES PATENTS

| Number | Name | Date |
| --- | --- | --- |
| Re. 16,126 | Schuler | July 28, 1925 |
| 429,804 | Baldwin | June 10, 1890 |
| 434,684 | Van Depoele | Aug. 19, 1890 |
| 674,825 | De Castro | May 21, 1901 |
| 831,930 | Clark | Sept. 25, 1906 |
| 1,180,815 | Anchutz et al. | Apr. 25, 1916 |
| 1,319,040 | Black | Oct. 21, 1919 |
| 1,511,240 | Sperry et al. | Oct. 14, 1924 |
| 1,885,662 | Whitehorn | Nov. 1, 1932 |

FOREIGN PATENTS

| Number | Country | Date |
| --- | --- | --- |
| 82,349 | Switzerland | Sept. 16, 1919 |